United States Patent
Nonogaki

(10) Patent No.: US 9,002,118 B2
(45) Date of Patent: Apr. 7, 2015

(54) IMAGE FEATURE EXTRACTION DEVICE, IMAGE FEATURE EXTRACTION METHOD, AND IMAGE RECOGNITION DEVICE

(71) Applicant: Kabushiki Kaisha Toshiba, Minato-ku, Tokyo (JP)

(72) Inventor: Nobuhiro Nonogaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 14/024,390

(22) Filed: Sep. 11, 2013

(65) Prior Publication Data

US 2014/0286576 A1     Sep. 25, 2014

(30) Foreign Application Priority Data

Mar. 22, 2013   (JP) ................... 2013-060863

(51) Int. Cl.
G06K 9/38  (2006.01)
G06K 9/46  (2006.01)
G06K 9/52  (2006.01)
G06K 9/00  (2006.01)

(52) U.S. Cl.
CPC .............. G06K 9/52 (2013.01); G06K 9/00523 (2013.01)

(58) Field of Classification Search
None
See application file for complete search history.

(56) References Cited

U.S. PATENT DOCUMENTS

| | | | |
|---|---|---|---|
| 5,587,927 A | 12/1996 | Nagao et al. | |
| 7,620,204 B2 | 11/2009 | Porikli et al. | |
| 7,720,289 B2 | 5/2010 | Porikli et al. | |
| 8,447,114 B2 | 5/2013 | Watanabe et al. | |
| 8,594,394 B2 * | 11/2013 | Bringer et al. | 382/125 |
| 2008/0137957 A1 * | 6/2008 | Xu et al. | 382/190 |
| 2009/0238460 A1 | 9/2009 | Funayama et al. | |
| 2009/0324077 A1 * | 12/2009 | Wu et al. | 382/170 |
| 2013/0188876 A1 * | 7/2013 | Demandolx et al. | 382/199 |

FOREIGN PATENT DOCUMENTS

| | | |
|---|---|---|
| JP | 06-282651 | 10/1994 |
| JP | 2007-164772 | 6/2007 |
| JP | 2007-213560 | 8/2007 |
| JP | 2010-044439 | 2/2010 |

OTHER PUBLICATIONS

Dalal, et al., "Histograms of Oriented Gradients for Human Detection", Proceedings 2005 IEEE Computer Society Conference on Computer Vision and Pattern Recognition, CVPR2005, vol. 1., pp. 886-893, 2005.

* cited by examiner

Primary Examiner — Brian P Werner
(74) Attorney, Agent, or Firm — Knobbe, Martens, Olson & Bear, LLP

(57) ABSTRACT

An image feature extraction device according to an embodiment includes a gradient image calculator generates intensity gradient data with respect to two different directions based on intensity data of image data; and a gradient count unit calculates a covariance matrix for each partial area obtained by dividing the image data based on the intensity gradient data. The image feature extraction device according to the embodiment further includes a feature data output unit calculates two parameters related to a major axis and a minor axis of an ellipse expressed by the covariance matrix, quantizes a range of the logarithms of the parameters for each of the partial area using a predetermined division number, and outputs a feature vector which contains a value only at a dimension corresponding to the quantized range different from the other dimensions.

17 Claims, 2 Drawing Sheets

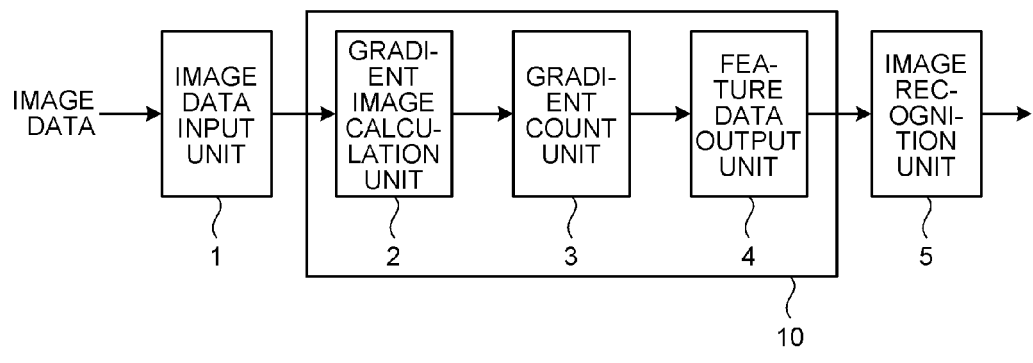

IMAGE FEATURE EXTRACTION DEVICE, IMAGE FEATURE EXTRACTION METHOD, AND IMAGE RECOGNITION DEVICE

CROSS-REFERENCE TO RELATED APPLICATIONS

This application is based upon and claims the benefit of priority from Japanese Patent Application No. 2013-060863, filed on Mar. 22, 2013; the entire contents of which are incorporated herein by reference.

FIELD

Embodiments of the present invention relate to an image feature extraction device, an image feature extraction method, and an image recognition device.

BACKGROUND

Conventionally, an image recognition device performs a process of recognizing an image patch of an object, which includes two steps of extracting feature data from the image and recognizing the image using the extracted features. In the process of extracting of the feature data which is a previous step of improving recognition accuracy, it is important to include information used to significantly classify a recognition target object from others by statistically.

BRIEF DESCRIPTION OF THE DRAWINGS

FIG. 1 is a block diagram illustrating a configuration of an image recognition device 100 according to the embodiment;

FIGS. 2A and 2B are diagrams illustrating a Sobel filter according to the embodiment;

FIGS. 3A and 3B are diagrams illustrating a Roberts filter according to the embodiment;

DETAILED DESCRIPTION

Figure 4:
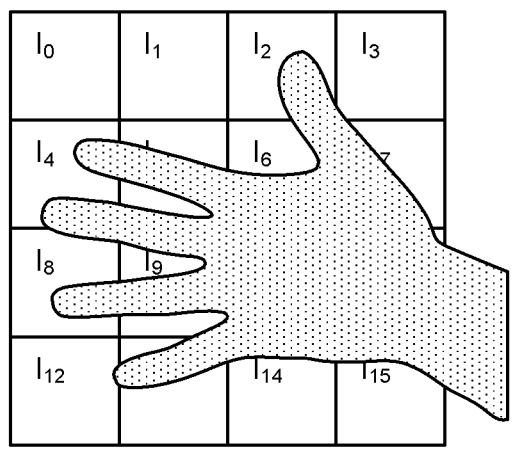
FIG. 4 is a diagram illustrating an example of partial areas $I_1, \ldots,$ and $I_n$ according to the embodiment.

An image feature extraction device according to an embodiment of the invention includes a gradient image calculator generates intensity gradient data with respect to two different directions based on intensity data of image data; and a gradient count unit calculates a covariance matrix for each partial area obtained by dividing the image data based on the intensity gradient data. The image feature extraction device according to the embodiment further includes a feature data output unit calculates two parameters related to a major axis and a minor axis of an ellipse expressed by the covariance matrix, quantizes a range of the logarithms of the parameters for each of the partial area using a predetermined division number, and outputs a feature vector which contains a value only at a dimension corresponding to the quantized range different from the other dimensions.

Hereinafter, an image feature extraction device, an image feature extraction method, and an image recognition device according to embodiments will be described with reference to the accompanying drawings. However, the invention is not limited to these embodiments.

First Embodiment

FIG. 1 is a block diagram illustrating a configuration of an image recognition device 100 according to the embodiment. The image recognition device 100 includes an image data input unit 1, an image feature extraction device 10, and an image recognition unit 5. The image data input unit 1 is a unit, for example, a camera, a sensor, or the like which acquires image data, and outputs intensity data in a 2D plane based on the acquired image data. The image feature extraction device 10 includes a gradient image calculation unit 2 which calculates an gradient image for every pixel in the image data, a gradient count unit 3 which divides the gradient image into a plurality of areas and counts gradient function values at the plurality of pixels in each area, and a feature data output unit 4 which outputs feature data (a feature vector) from the count result. The image recognition unit 5 identifies images based on an existing machine learning technique.

Data to be input to the image data input unit 1 may be entire data of the whole screen, or may be data of a partial image which is mapped by an affine transformation and clipped from the screen. In addition, the image data may be of any types as long as it can be converted into numerical data which is expressed in the intensity data of a 2D plane (a 2D array), such as intensity information, visual light information of color (color-difference) information, distance information (depth), and an infrared image.

The gradient image calculation unit 2 calculates the gradient image from the intensity data of the 2D plane. The gradient image may be calculated using any method as long as the gradient (a first order difference) can be calculated with respect to two different directions, for example, two directions perpendicular to each other, at each pixel position. For example, as illustrated in FIGS. 2A and 2B, the outputs of a set of 3×3 Sobel filters may be used as the gradient image. As another filter, Roberts filters as illustrated in FIGS. 3A and 3B may be used.

In the gradient count unit 3, a rectangular area in the gradient image generated by the gradient image calculation unit 2 is divided into a plurality of partial areas $I_0, \ldots,$ and $I_{15}$, and a covariance matrix is calculated for each partial area $I_k$ (k=0, ..., 15). Each partial area $I_k$ includes a plurality of pixels. FIG. 4 illustrates an example in which the rectangular area is divided into 16 partial areas $I_k$, but the number of partial areas is not limited thereto. Further, the gradient image generated by the gradient image calculation unit 2 is divided into a plurality of rectangular areas, and the following calculations are performed on all the rectangular areas.

Assuming that a gradient image in the x direction is $gx_{ij}$ and a gradient image in the y direction is $gy_{ij}$ at the pixel position (i, j) included in the partial area $I_k$, three scalar values $\sigma_k^0(I_k)$, $\sigma_k^1(I_k)$, and $\sigma_k^2(I_k)$ are obtained as components of the covariance matrix $H_k$ from the gradient images $gx_{ij}$ and $gy_{ij}$ for each partial area $I_k$. Herein, when the number of pixels in the partial area $I_k$ in the width direction is set as cw and the number of pixels thereof in the height direction is set as ch, each of $\sigma_k^0(I_k)$, $\sigma_k^1(I_k)$, and $\sigma_k^2(I_k)$ can be expressed as follows.

[Expression 1]

$$\sigma_k^0(I_k) = \sum_{i=0}^{ch} \sum_{j=0}^{cw} (gx_{ij})^2 \tag{1}$$

[Expression 2]

$$\sigma_k^1(I_k) = \sum_{i=0}^{ch} \sum_{j=0}^{cw} (gx_{ij})^2 \tag{2}$$

[Expression 3]
$$\sigma_k^2(I_k) = \sum_{i=0}^{ch} \sum_{j=0}^{cw} (gx_{ij} \cdot gy_{ij}) \quad (3)$$

When $\sigma_k^0(I_k)$, $\sigma_k^1(I_k)$, and $\sigma_k^2(I_k)$ are expressed in a matrix, the covariance matrix $H_k$ of Expression (4) is obtained.

[Expression 4]
$$H_k = \begin{bmatrix} \sigma_k^0 & \sigma_k^2 \\ \sigma_k^2 & \sigma_k^1 \end{bmatrix} \quad (4)$$

Since the covariance matrix $H_k$ is a positive definite Hermitian matrix, a real number and a non-negative eigenvalue are included. Herein, the feature data output unit 4 performs an eigenvalue decomposition on the matrix $H_k$ to obtain a diagonal matrix $\Lambda$ and an orthogonal matrix $P$ satisfying $H_k = P \Lambda P^{-1}$. Based on the diagonal matrix $\Lambda$ and the orthogonal matrix $P$, the elliptic equation of Expression (5) can be obtained using $\alpha$ as a parameter.

[Expression 5]
$$f(\alpha) = P\Lambda \begin{bmatrix} \cos\alpha \\ \sin\alpha \end{bmatrix} \quad (5)$$

Figure 5:
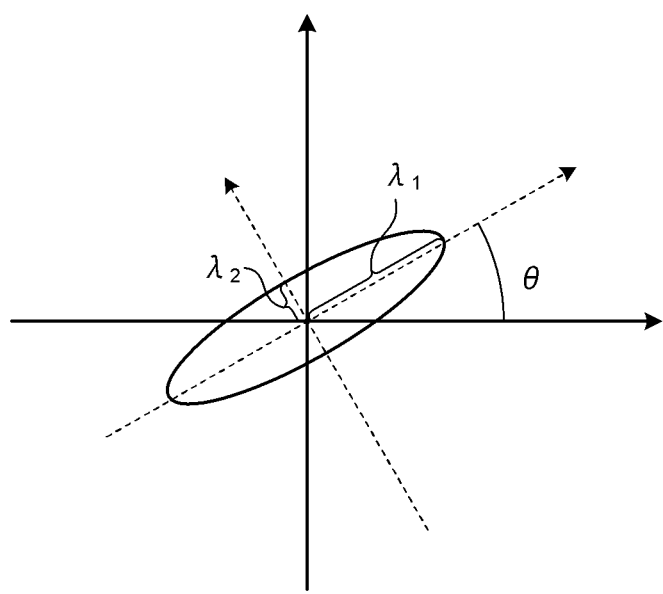
FIG. 5 is a diagram illustrating an ellipse expressed by an elliptic equation which is derived from a diagonal matrix $\Lambda$ and an orthogonal matrix P according to the embodiment.

FIG. 5 is a diagram illustrating an ellipse expressed by an elliptic equation which is derived from the diagonal matrix $\Lambda$ and the orthogonal matrix $P$ according to the embodiment. At this time, the lengths of the major axis $\lambda_1$ and the minor axis $\lambda_2$ of the ellipse are obtained from the diagonal matrix $\Lambda$ illustrated in Expression (6).

[Expression 6]
$$\Lambda = \begin{bmatrix} \lambda_1 & 0 \\ 0 & \lambda_2 \end{bmatrix} \quad (6)$$
where,
$\lambda_1 > \lambda_2$ Since it is empirically known that the axes $\lambda_1$ and $\lambda_2$ are logarithmically distributed in a natural image, the logarithms $\log \lambda_1$ and $\log \lambda_2$ of these axes are obtained as the feature data.

On the other hand, the axial angle $\theta$ of the major axis of the ellipse is obtained from the orthogonal matrix $P$ illustrated in Expression (7) (Expression (8)).

[Expression 7]
$$P = \begin{bmatrix} P_1 & -P_2 \\ P_2 & P_1 \end{bmatrix} = S \begin{bmatrix} \cos\theta & -\sin\theta \\ \sin\theta & \cos\theta \end{bmatrix} \quad (7)$$

[Expression 8]
$$\theta = \tan^{-1}\left(\frac{P_2}{P_1}\right) \quad (8)$$

The obtained parameters $\theta$, $\log \lambda_1$, and $\log \lambda_2$ are further quantized and vectorized to obtain feature vectors $v_k^0$, $v_k^1$, and $v_k^2$. For example, when the range of the parameter x is [−r, +r) ([a, b) represents a left-closed and right-open interval $\{x | a \leq x < b\}$), the parameter is quantized by the following equation so as to be n bits, that is, $2^n$ gray scales $(0, \ldots, 2^n - 1)$.

$[2^n \times (x-(-r))/(r-(-r))]$ (where the notation [Y] represents a Gauss's symbol denoting a maximum integer not exceeding Y)

In a case where the quantized value is obtained in each of equally-spaced ranges, the obtained quantized values are converted into a $2^n$-dimensional binary vector, that is, a vector in which only the dimension ((Quantized Value+1) dimension) corresponding to the quantized value is set to 1 and the others are 0.

For example, in a case where the range is [−π, +π) and the parameter $\theta = \pi/4$, when the values are quantized at n=4, the equation is as follows.

$[2^4 \times (\pi/4-(-\pi))/(\pi-(-\pi))] = 10$

Therefore, a $2^4 (=16)$-dimensional vector, that is, a binary vector in which the value in only the 11th dimension is set to 1 and the others are set to 0 is obtained as follows.

$\{0, 0, 0, 0, 0, 0, 0, 0, 0, 0, 1, 0, 0, 0, 0, 0\}$

In a case where the range includes infinity $\infty$ such as $[0, +\infty)$, the distribution of the parameters is empirically examined, the parameter c is selected as an upper limit of the range such that a cumulative frequency is relatively set to $(2^n-1)/2^n$. The range [0, c) is set to be in the $(2^n-1)$ dimension. Then, the range $[c, +\infty)$ is set to be in the $2^n$-th dimension. The vectorization of the $2^n$-dimensional binary is the same as described above.

The description has been made in connection with that the division number of the range is $2^n$, and the division number is not limited to the power of 2. For example, in a case where the division number is m, when the range of the parameter x is [−r, +r), the values are quantized with the following equation.

$[m \times (x-(-r))/(r-(-r))]$

In addition, in a case where the range is $[0, +\infty)$, the parameter c is selected as an upper limit of the range such that the cumulative frequency is relatively set to $(m-1)/m$. The range [0, c) may be set to be in the $(m-1)$ dimension, and the range $[c, +\infty)$ may be set to be in the m-th dimension.

In this way, the parameters $\theta$, $\log \lambda_1$, and $\log \lambda_2$ for the partial area $I_k$ are subjected to the quantization and the binary vectorization to obtain the feature vectors $v_k^0$, $v_k^1$, and $v_k^2$. According to the embodiment, it is possible to obtain the feature vectors in small amounts of calculation.

The feature data output unit 4 outputs the feature vectors obtained from all of the partial areas $I_k$ to be sent to the image recognition unit 5 as inputs. Note that the feature vectors obtained from all of the partial areas $I_k$ may be linked and sent to the image recognition unit 5 as inputs, as the feature vectors of a dimension calculated by ((the division number of the $\theta$ range)+(the division number of the $\log \lambda_1$ range)+(the division number of the $\log \lambda_2$ range))×(the number of partial areas). Since the feature vectors are subjected to the existing machine learning technique, for example, a support vector machine, a boosting method, a random forest, or the like which is executed by the image recognition unit 5, it is possible to obtain an recognition performance of high accuracy. This is because it is possible to train a linear classification model by converting the feature vectors into a binary vector of a high dimension number.

Second Embodiment

In the first embodiment, in order to perform the eigenvalue decomposition for the calculation of the parameters $\theta$, $\lambda_1$, and $\lambda_2$, there is a need to calculate the square root when the parameters $\lambda_1$ and $\lambda_2$ are calculated. In a second embodiment, there is exemplified a scheme of reducing the calculation amount by omitting the square root calculation. In the covariance matrix $H_k$, the following relations are used.

$$|(\text{trace}(H_k)|=|(\lambda_1+\lambda_2)|$$

$$\det(H_k)=\lambda_1\lambda_2$$

Then, instead of the parameters $\lambda_1$ and $\lambda_2$, for example, $t=|\text{trace}(H_k)|$ and $d=\det(H_k)$ are used.

Herein, the parameters t and d can be calculated using the components of the covariance matrix $H_k$.

[Expression 9]

$$t=|\text{trace}(H_k)|=\text{abs}(\sigma_k^0+\sigma_k^1) \quad (9)$$

[Expression 10]

$$d=\det(H_k)=\sigma_k^0\sigma_k^1-(\sigma_k^2)^2 \quad (10)$$

In addition, when the orthogonal matrix P and the diagonal matrix $\Lambda$ are analytically solved, the parameter $\theta$ can be directly obtained from the components of the covariance matrix $H_k$.

[Expression 11]

$$\theta = \tan^{-1}\left(\frac{2\sigma_k^2}{\sigma_k^0 - \sigma_k^1}\right) \quad (11)$$

Therefore, the feature data of $\theta$, log t, and log d can be obtained from the covariance matrix $H_k$ only by the four arithmetic operations, the logarithm function (log), and the arctangent function ($\tan^{-1}$). Similarly to the first embodiment, the feature data can be converted into the feature vector through the quantization and the binary vectorization.

In the image feature extraction devices according to the first and second embodiments, since a gradient distribution of local areas is used as the feature data, it can be said that there is a feature in smoothness in a rotation direction. Therefore, these devices are effective in recognizing an object which has a less repeating pattern but important in direction. In addition, the image feature extraction devices according to the first and second embodiments can realize a robust extraction of the feature data with respect to the gradient distribution in a small amount of calculation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image feature extraction device comprising:
   a gradient image calculator generates intensity gradient data with respect to two different directions based on intensity data of image data;
   a gradient count unit calculates a covariance matrix for each partial area obtained by dividing the image data based on the intensity gradient data; and
   a feature data output unit calculates two parameters related to a major axis and a minor axis of an ellipse expressed by the covariance matrix, quantizes a range of the logarithms of the parameters for each of the partial area using a predetermined division number, and outputs a feature vector which contains a value only at a dimension corresponding to the quantized range different from the other dimensions.

2. The image feature extraction device according to claim 1,
   wherein the parameters are eigenvalues of the covariance matrixes.

3. The image feature extraction device according to claim 1,
   wherein the parameters include an absolute value of a diagonal sum and a determinant of the covariance matrix.

4. The image feature extraction device according to claim 1,
   wherein the feature data output unit further calculates a parameter related to the amount of rotation of the ellipse, and outputs the feature vector for each of the partial areas based on the amount of rotation.

5. The image feature extraction device according to claim 1,
   wherein the feature data output unit connectively outputs the feature vectors of the respective partial areas.

6. The image feature extraction device according to claim 1,
   wherein the two different directions are perpendicular to each other.

7. The image feature extraction device according to claim 1,
   wherein the division number is a power of 2.

8. An image feature extraction method comprising:
   generating intensity gradient data with respect to two different directions based on intensity data of an image data;
   calculating a covariance matrix for each partial area obtained by dividing the image data based on the intensity gradient data with respect to the two different directions;
   calculating two parameters related to a major axis and a minor axis of an ellipse expressed by the covariance matrix;
   quantizing a range of the logarithms of the parameters for each of the partial area using a predetermined division number; and
   outputting a feature vector which contains a value only at a dimension corresponding to the quantized range different from the other dimensions.

9. The image feature extraction method according to claim 8,
   wherein the two parameters are eigenvalues of the covariance matrixes.

10. The image feature extraction method according to claim 8, wherein the two parameters include an absolute value of a diagonal sum and a determinant of the covariance matrix.

11. The image feature extraction method according to claim 8, further comprising:
    calculating a parameter related to the amount of rotation of the ellipse; and
    outputting the feature vector for each of the partial areas based on the amount of rotation.

12. The image feature extraction method according to claim 8,
    wherein the two different directions are perpendicular to each other.

13. The image feature extraction method according to claim 8,
    wherein the division number is a power of 2.

14. An image recognition device comprising:
    an image data input unit acquires image data and outputs intensity data based on the image data;
    a gradient image calculator generates intensity gradient data with respect to two different directions based on the intensity data;
    a gradient count unit calculates a covariance matrix for each partial area obtained by dividing the image data into a plurality of areas based on the intensity gradient data;
    a feature data output unit calculates two parameters related to a major axis and a minor axis of an ellipse expressed by the covariance matrix, quantizes a range of the logarithms of the parameters for each of the partial area using a predetermined division number, and outputs a feature vector which contains a value only at a dimension corresponding to the quantized range different from the other dimensions; and
    an image recognition unit identifies an image based on the feature vectors.

15. The image recognition device according to claim 14,
    wherein the two parameters include eigenvalues of the covariance matrixes.

16. The image recognition device according to claim 14,
    wherein the two parameters include an absolute value of a diagonal sum and a determinant of the covariance matrix.

17. The image recognition device according to claim 14,
    wherein the feature data output unit further calculates a parameter related to the amount of rotation of the ellipse, and outputs the feature vector for each of the partial areas based on the amount of rotation, and
    wherein the image recognition unit identifies an image based on the feature vector.

* * * * *